July 19, 1955  D. V. FELLA  2,713,211
SELF CENTERING GAUGE
Filed June 25, 1954
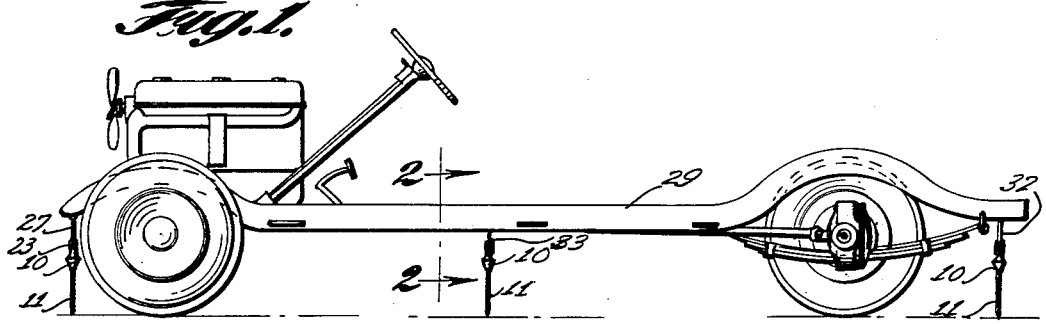
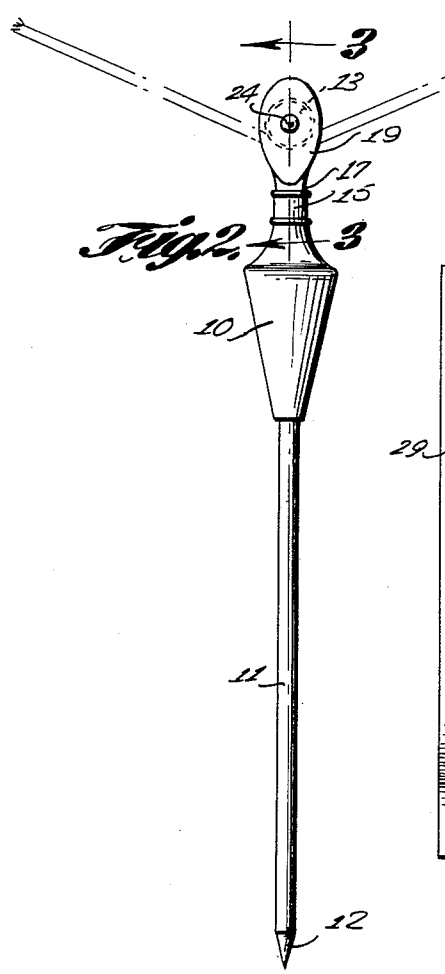
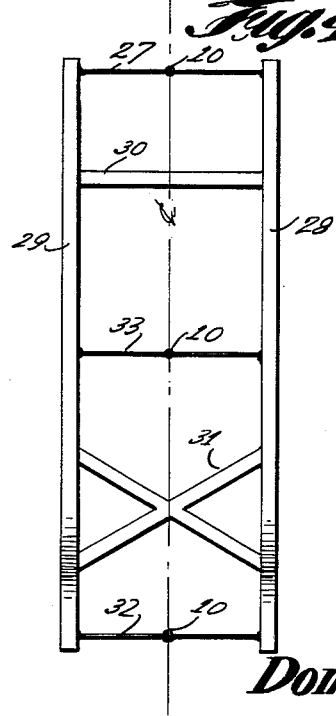
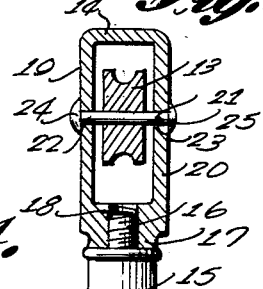
INVENTOR.
Dominick V. Fella
BY Victor J. Evans & Co.
ATTORNEYS

United States Patent Office 2,713,211
Patented July 19, 1955

2,713,211
SELF CENTERING GAUGE
Dominick V. Fella, Cheltenham, Pa.

Application June 25, 1954, Serial No. 439,240

2 Claims. (Cl. 33—216)

This invention relates to a centering device particularly adapted for use in combination with the frame or chassis of a motor vehicle, and in particular a weight in the form of a plumb-bob having a pulley block on the upper end and a point extended from the lower end whereby with the pulley positioned to travel on a cord suspended with slack therein between two points the weight of the device will cause the pulley to travel to a point substantially midway between the two points from which the cord is suspended.

The purpose of this invention is to provide a device that facilitates centering the frame or chassis of a motor vehicle to ascertain whether or not the frame is in alignment.

Various types of devices have been provided for aligning and also for determining centrally disposed points of motor vehicle frames, however, with conventional gauges for this use it is necessary to set the gauge at one point and carry the gauge to different points throughout the length of the frame. In numerous instances it is difficult to find a straight edge that extends continually throughout the frame or chassis and for this reason it is difficult to find a true longitudinal center of a motor vehicle frame. With this thought in mind, this invention contemplates the use of a plurality of centering gauges whereby with the gauges suspended by cords from end and intermediate parts of motor vehicle or other frames each gauge will seek the exact center at the point of the frame from which the gauge is suspended and the centers may be aligned from an end of the frame.

The object of this invention is, therefore, to provide means for determining a longitudinal center of a frame with the use of a plurality of devices that may readily be positioned on the frame.

Another object of the invention is to provide a centering gauge for aligning frames of motor vehicles and the like in which the device is adapted to be used on frames now in use without changing parts of the frames.

A further object of the invention is to provide a centering gauge for ascertaining the longitudinal center of a frame, particularly such as a motor vehicle chassis, in which the centering device is of a simple and economical construction.

With these and other objects and advantages in view, the invention embodies a substantially conical shape body having a pulley block threaded on a stud extended from the upper end and having a point depending from the lower end wherein with a cord extended through the pulley block and secured at the ends the device will travel to a point midway between the points to which the ends of the cord are attached.

Other features and advantages of the invention will appear from the following description taken in connection with the drawing, wherein:

Figure 1 is a side elevational view showing the chassis of a motor vehicle and illustrating the centering gauge of this invention with a gauge positioned at each end of the chassis and also with a gauge positioned at a point midway between the ends of the chassis.

Figure 2 is an elevational view taken on line 2—2 of Figure 1, showing the centering gauge, the parts of which are shown on an enlarged scale.

Figure 3 is a detail taken on line 3—3 of Figure 2, showing an elevational view of the centering gauge with the pulley block at the upper end of the device and also with the lower part of the device broken away and shown in section, the parts being shown on a still further enlarged scale.

Figure 4 is a plan view of a frame, such as a motor vehicle chassis, illustrating the use of the device with one of the devices suspended between the side beams at each end of the frame and another between the side beams at a point midway of the length of the frame.

Referring now to the drawing wherein like reference characters denote corresponding parts, the improved centering gauge of this invention includes a substantially conical shape body 10, a stem 11 having a point 12 on the lower end extended downwardly from the body and a pulley 13 in a pulley block 14 positioned on the upper end of the body.

In the design shown the body 10 is provided with a neck 15 having a threaded stud 16 extended from the upper end and a base 17 of the pulley block 14 is provided with a threaded socket 18 in which the stud 16 is threaded whereby the pulley block is secured to the upper end of the body. It will be understood, however, that the pulley block may be secured to the body by other suitable means.

As illustrated in Figure 3, the pulley block 14 is provided with side walls 19 and 20 and the pulley 13 is rotatably mounted on a pin 21 that is secured in openings 22 and 23 in the side walls. The ends of the pin 21 are formed to provide heads 24 and 25 by which the pin is secured in position.

The lower end of the body 10 is provided with a threaded socket 26 in which the upper end of the stem 11 is threaded, as shown in Figure 3, and it will also be understood that the stem or point may be secured to the body by other suitable means.

With the self-centering gauge provided as shown and described a gauge may be suspended by a cord 27 and one end of a frame having side beams 28 and 29 connected with cross members 30 and 31, another gauge may be suspended by a cord 32 extended across the opposite ends of the side members and another gauge by a cord 33 positioned at a point substantially midway between the ends of the frame. The ends of the cords may be tied to the side beams or other parts of the frame or secured thereto by other suitable means. The cords are attached with sufficient slack to permit the gauge devices to find the center between the points from which the cords are suspended.

With a plurality of the devices suspended at points throughout the length of the frame a mechanic or the like may readily determine whether or not the frame is in alignment.

Although the device has been disclosed and described as being particularly adapted for a frame or chassis of a motor vehicle, it will be understood that the self centering gauge may be used for other purposes.

It will also be understood that modifications, within the scope of the appended claims, may be made in the design and arrangement of the parts without departing from the spirit of the invention.

What is claimed is:

1. In a self-centering gauge, the combination which comprises a substantially conical shaped body providing a weight, said body having a threaded socket in the lower end and a threaded stud extended from the upper end, a frame having a pulley rotatably mounted therein threaded on the stud, and a stem having a point on the lower end threaded in the socket in the lower end of the body.

2. In a self-centering gauge, the combination which comprises a substantially conical shaped body providing a weight, said body having a threaded socket in the lower end and a threaded stud extended from the upper end, a frame having a pulley rotatably mounted therein threaded on the stud, a stem having a point on the lower end threaded in the socket in the lower end of the body and a cord extended through the pulley block and adapted to be connected to members of a frame.

References Cited in the file of this patent

UNITED STATES PATENTS

| | | |
|---|---|---|
| 439,402 | Held | Oct. 28, 1890 |
| 488,874 | Deniston | Dec. 27, 1892 |
| 1,014,446 | Butler | Jan. 9, 1912 |
| 1,227,168 | Matthews | May 22, 1917 |